United States Patent
Miura et al.

[11] Patent Number: 5,812,228
[45] Date of Patent: Sep. 22, 1998

[54] COLOR LIQUID CRYSTAL DISPLAY WITH EXTENSIONS OF THE COLORED LAYER COVER THE LIGHT-IMPERMEABLE LAYER

[75] Inventors: Junichirou Miura, Kagoshima; Toshiaki Ishiyama, Tokyo, both of Japan

[73] Assignee: NEC Corporation, Tokyo, Japan

[21] Appl. No.: 538,211

[22] Filed: Oct. 3, 1995

[30] Foreign Application Priority Data

Oct. 28, 1994 [JP] Japan .................................. 6-265572

[51] Int. Cl.⁶ ........................ G02F 1/1335; G02F 1/1333
[52] U.S. Cl. .......................... 349/106; 349/108; 349/109; 349/110
[58] Field of Search .................... 349/109, 108, 349/110, 106

[56] References Cited

U.S. PATENT DOCUMENTS

| | | | |
|---|---|---|---|
| 4,986,637 | 1/1991 | Yamaguchi | 350/339 |
| 5,144,288 | 9/1992 | Hamada et al. | 340/702 |
| 5,311,337 | 5/1994 | McCartney, Jr. | 359/61 |
| 5,610,738 | 3/1997 | Sasano et al. | 349/43 |
| 5,648,858 | 7/1997 | Shibata et al. | 349/57 |
| 5,657,105 | 8/1997 | McCartney | 349/157 |
| 5,680,183 | 10/1997 | Sasuga et al. | 349/58 |

FOREIGN PATENT DOCUMENTS

| | | |
|---|---|---|
| 0 338 412 | 10/1989 | European Pat. Off. . |
| 95115731 | 1/1997 | European Pat. Off. . |
| 6-130217 | 5/1994 | Japan . |
| 6-174916 | 6/1994 | Japan . |

OTHER PUBLICATIONS

"Color Liquid Crystal Display", IBM Technical Disclosure Bulletin, vol. 36, No. 5, May 1993.

*Primary Examiner*—William L. Sikes
*Assistant Examiner*—Julie Ngo
*Attorney, Agent, or Firm*—Whitham, Curtis & Whitham

[57] ABSTRACT

The invention provides a color liquid crystal display including (a) two transparent substrates A and B disposed in facing relation, (b) a plurality of switching elements disposed on a surface of the substrate A, the surface facing the substrate B, said switching elements defining an area, (c) a light-impermeable layer disposed on a surface of the substrate B, the surface facing the substrate A, and (d) a colored layer overlying the light-impermeable layer and defining a display area corresponding to the area defined by the switching elements. The colored layer has an extension extending over the display area in longitudinal and transverse directions of the display area. The extensions of the colored layer cover the light-impermeable layer therewith to thereby prevent a light reflected from the light-impermeable layer from entering the switching element. Thus, it is possible to prevent the black level of the display area from being whitened.

15 Claims, 3 Drawing Sheets

COLOR LIQUID CRYSTAL DISPLAY WITH EXTENSIONS OF THE COLORED LAYER COVER THE LIGHT-IMPERMEABLE LAYER

BACKGROUND OF THE INVENTION

1. Field of the Invention

The invention relates to a color liquid display, and more particularly to an active matrix color liquid display including two transparent substrates facing each other, on one of which are arranged switching elements in an array configuration.

2. Description of the Related Art

FIG. 1 is a cross-sectional view illustrating an outermost end of a display area of a conventional color liquid crystal display (LCD). A pair of transparent substrates 1 and 2 are disposed in facing relation. On the substrate 1 are formed a light-impermeable layer 3 composed of metal such as chromium, a colored layer 4 a part of which overlies the light-impermeable layer 3 and the remainder of which directly overlies the substrate 1, and a transparent electrode 8 entirely covering over the light-impermeable layer 3 and the colored layer 4. On the other substrate 2 are formed a plurality of picture element switching elements 5 composed of, for instance, a thin amorphous silicon film, a pair of picture element wirings 6 which are disposed adjacent to and at opposite sides of the switching element 5 and a part of which overlies the switching element 5, and a transparent electrode 8 a part of which overlies on one of the picture element wirings 6 and which extends in the same direction as a direction in which the colored layer 4 extends. Between the substrates 1 and 2 is enclosed liquid crystal to thereby form a liquid crystal layer 7. As illustrated in FIG. 1, the colored layer 4 generally overlaps the light-impermeable layer 3 to the extent that an end of the colored layer 4 reaches an end of the switching element 5 disposed on the transparent substrate 2.

FIG. 2 illustrates another conventional color liquid crystal display having been suggested in Japanese Unexamined Patent Public Disclosures Nos. 4-1726 and 4-1728. In this color liquid crystal display, on the light-impermeable layer 3 is further formed a film 11 which absorbs a light thereinto in No. 4-1726 or a thin resin film 11 in No. 4-1728.

The light-impermeable layer 3 has a function of preventing a light from transmitting through the transparent substrate 1 and of preventing light passing the transparent substrate 2 from being radiated to the switching element 5. However, in a conventional liquid crystal display, as illustrated in FIG. 1, when a back light 9 is transmitted into a liquid crystal display, a light reflected from the light-impermeable layer 3 is radiated to the switching element 5 at its end, thereby a backward current is generated in the switching element 5. Thus, there arises a problem that a backward current causes the black level at an end of a display to be whitened.

The liquid crystal display having the light-absorbing film or thin resin film 11 overlying the light-impermeable layer 3 as illustrated in FIG. 2 can almost overcome the above mentioned problem. However, in order to fabricate the liquid crystal display illustrated in FIG. 2, it is necessary to add new steps for fabricating the light-absorbing film or thin resin film 11.

In general, photo resist is used in the formation of the colored layer 4. However, when an end of the colored layer 4 is to be formed, a step tends to be unadvantageously formed on a surface of the colored layer 4 at its end, since exposure condition delicately changes due to a light transmitting from the outside of a photo resist mask. If a colored layer having a step thereon is used as a display, there arises a problem of display nonuniformity, because the stepped portion has a different transmissivity from other portions.

SUMMARY OF THE INVENTION

It is an object of the present invention to provide a color liquid crystal display capable of preventing a light reflecting from a light-impermeable layer from being radiated to a picture element switching element to thereby prevent the black level from being whitened, and also of eliminating nonuniformity of display to be caused by a step formed on a light-impermeable layer.

The invention provides a color liquid crystal display including (a) two transparent substrates A and B disposed in facing relation, (b) a plurality of switching elements disposed on a surface of the substrate A, the surface facing the substrate B, the switching elements defining an area, (c) a light-impermeable layer disposed on a surface of the substrate B, the surface facing the substrate A, and (d) a colored layer overlying the light-impermeable layer and defining a display area corresponding to the area defined by the switching elements, the colored layer having extensions extending over the display area in longitudinal and transverse directions of the display area. The extension preferably has a length of at least one picture element.

The invention further provides a color liquid crystal display including (a) two transparent substrates A and B disposed in facing relation, (b) a plurality of switching elements disposed on a surface of the substrate A, the surface facing the substrate B, the switching elements defining an area, (c) a light-impermeable layer disposed on a surface of the substrate B, the surface facing the substrate A, and (d) a colored layer overlying the light-impermeable layer and defining a display area corresponding to the area defined by the switching elements, the colored layer including a red-colored stripe-shaped region, a green-colored stripe-shaped region and a blue-colored stripe-shaped region successively arranged adjacent to each other in a longitudinal direction of the display area, each of the regions including a plurality of picture elements successively arranged adjacent to each other in a transverse direction of the display area, the colored layer having extensions extending over the display area in the longitudinal and transverse directions of the display area, the longitudinal extension having a length of at least three picture elements and the transverse extension having a length of at least one picture elements.

The invention still further provides a color liquid crystal display including (a) two transparent substrates A and B disposed in facing relation, (b) a plurality of switching elements disposed on a surface of the substrate A, the surface facing the substrate B, the switching elements defining an area, (c) a light-impermeable layer disposed on a surface of the substrate B, the surface facing the substrate A, and (d) a colored layer overlying the light-impermeable layer and defining a display area corresponding to the area defined by the switching elements, the colored layer including red-colored picture elements, green-colored picture elements and blue-colored picture elements successively arranged adjacent to each other in a lattice configuration in longitudinal and transverse directions of the display area so that one of the picture elements is surrounded by the other two picture elements, the colored layer having extensions extending over the display area in the longitudinal and transverse directions of the display area, the longitudinal extension having a length of at least three picture elements and the transverse extension having a length of at least three picture elements.

The invention yet further provides a color liquid crystal display including (a) two transparent substrates A and B disposed in facing relation, (b) a plurality of switching elements disposed on a surface of the substrate A, the surface facing the substrate B, the switching elements defining an area, (c) a light-impermeable layer disposed on a surface of the substrate B, the surface facing the substrate A, and (d) a colored layer overlying the light-impermeable layer and defining a display area corresponding to the area defined by the switching elements, the colored layer including a plurality of rows each having red-colored picture elements, green-colored picture elements and blue-colored picture elements successively arranged adjacent to each other in a longitudinal and direction of the display area, the rows being offset to each other by half of a length of one picture element so that one of the picture elements is surrounded by the other two picture elements, the colored layer having extensions extending over the display area in the longitudinal and transverse directions of the display area, the longitudinal extension having a length of at least three picture elements and the transverse extension having a length of at least three picture elements.

By covering the light-impermeable layer with the extensions of the colored layer, it is possible to absorb a back light in the colored layer. The remainder light not absorbed in the colored layer and thus having transmitted therethrough is reflected at the light-impermeable layer. It is also possible to absorb the thus reflected light in the colored layer. Thus, by extending the colored layer outside from a boundary of a display area, it is possible to reduce a light reflected from the light-impermeable layer and radiated to a switching element disposed at an end of a display area, thereby the switching element being no longer influenced by a light. Thus, the black level in the display area can be prevented from being whitened. According to the experiment which the inventors had conducted, whitening of the black level of the display area at the end thereof could be completely prevented. The extensions of the colored layer can be formed only by modifying a photo resist pattern.

In addition, it is not necessary to add a new step or new steps for forming requisite layers, because the colored layer constituting the display area is extended to partially cover the light-impermeable layer.

Furthermore, the display area constituted of the colored layer originates from a colored layer disposed at least second outermost, and hence it is no longer necessary to use an outermost colored layer which has a step thereon. Accordingly, nonuniformity of display to be caused by a stepped portion of a colored layer can be prevented.

BRIEF DESCRIPTION OF THE DRAWINGS

The above and other objects and advantageous features of the present invention will be made apparent from the following description made with reference to the accompanying drawings, in which like reference characters designate the same or similar parts throughout the drawings in which.

DESCRIPTION OF THE PREFERRED EMBODIMENTS

Figure 3:
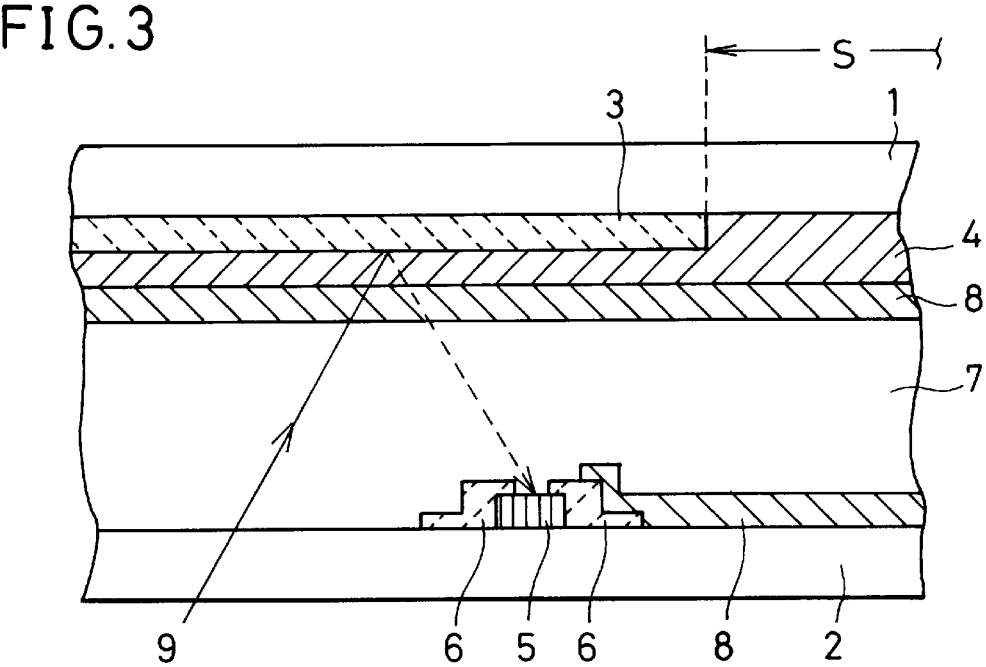
FIG. 3 is a cross-sectional view of a color liquid crystal display in accordance with the first embodiment of the present invention.

FIG. 3 illustrates an end portion of a display area of a color liquid crystal display in accordance with the first embodiment of the present invention. The liquid crystal display has two transparent substrates 1 and 2 disposed in facing relation. On the substrate 1 are formed a light-impermeable layer 3 composed of metal such as chromium, a colored layer 4 a part of which overlies on the light-impermeable layer 3 and the remainder of which directly overlies on the substrate 1, and a transparent electrode 8 entirely covering over the colored layer 4. On the substrate 2 are formed a plurality of picture element switching elements 5 (only one is illustrated) composed of, for instance, a thin amorphous silicon film, a pair of picture element wirings 6 which are disposed adjacent to and at opposite sides of the switching element 5 and a part of which overlies on the switching element 5, and a transparent electrode 8 a part of which overlies on one of the picture element wirings 6 and which extends in one direction. Between the substrates 1 and 2 are enclosed liquid crystal to thereby form a liquid crystal layer 7. The plurality of switching elements 5 define a certain area, and the colored layer 4 also defines a display area S corresponding to the area defined by the switching elements 5.

The colored layer 4 is formed with extensions 10a, 10b, 10c and 10d (see FIG. 4) each of which extends outwardly by a length of at least one picture element from a position which the switching element 5 faces. The extensions are made of the same material as that of the colored layer 4 constituting the display area S. For instance, the colored layer 4 is made of light-permeable resin containing pigment therein.

A back light 9 having transmitted through the transparent substrate 2 is absorbed in the colored layer 4. The remainder light not absorbed in the colored layer 4 is reflected at the light-impermeable layer 3. The thus reflected light can be absorbed in the colored layer 4, and hence it is possible to reduce a light reflected from the light-impermeable layer 3 and radiated to the switching element 5 disposed at the end of the display area S. As a result, it is possible to prevent the black level at the boundary of the display area, which is caused by a backward current running through the switching element 5, from being whitened.

Figure 4:
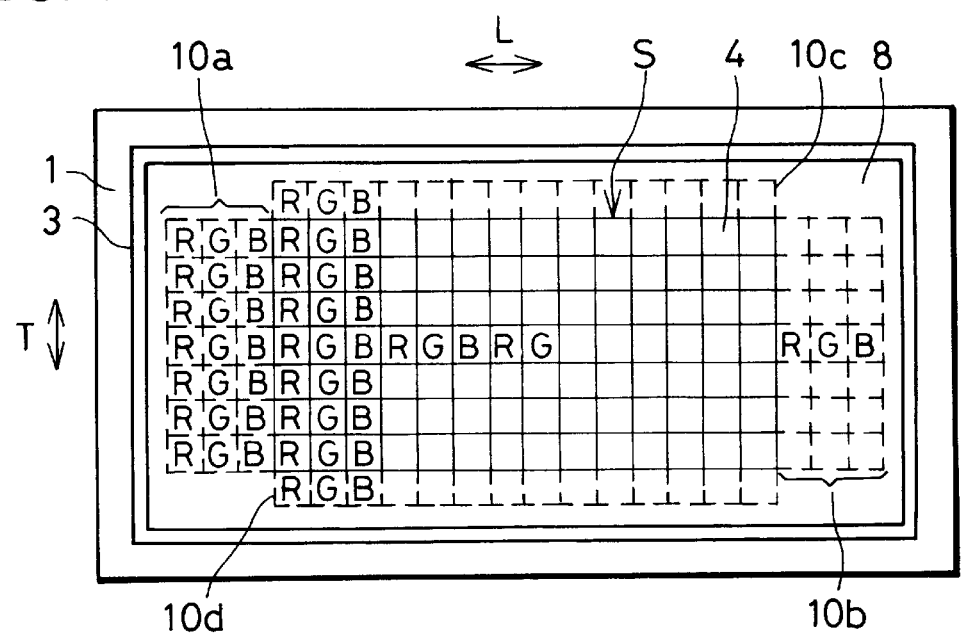
FIG. 4 is a plan view of one of substrates of the color liquid crystal display in accordance with the first embodiment of the present invention.

FIG. 4 is a plan view of the substrate 1 on which the colored layer 4 is arranged in a pattern. As illustrated, in the first embodiment, the colored layer 4 consists of a plurality of stripes. In the above description, the colored layer 4 means one disposed within the display area S. The colored layer 4 comprises a red-colored stripe-shaped region R, a green-colored stripe-shaped region G and a blue-colored stripe-shaped region B successively arranged adjacent to each other in a longitudinal direction L of the display area S. Each of the regions R, G and B comprises a plurality of picture elements successively arranged adjacent to each other in a transverse direction T of the display area S.

As earlier mentioned, the colored layer 4 is formed with the extensions 10a, 10b, 10c and 10d extending over the display area S. As illustrated in FIG. 4, the extensions 10a and 10b extend over the display S in the longitudinal direction L of the display area S, while the extensions 10c and 10d extend in the transverse direction T of the display area S. Each of the longitudinal extensions 10a and 10b has a length of three picture elements, while each of the transverse extensions 10c and 10d has a length of one picture element.

It should be noted that the extensions 10a to 10d may have a greater length. Thus, the longitudinal extensions 10a and 10b may have a length of four picture elements or greater, while the transverse extensions 10c and 10d may have a length of two picture elements or greater.

Figure 2:
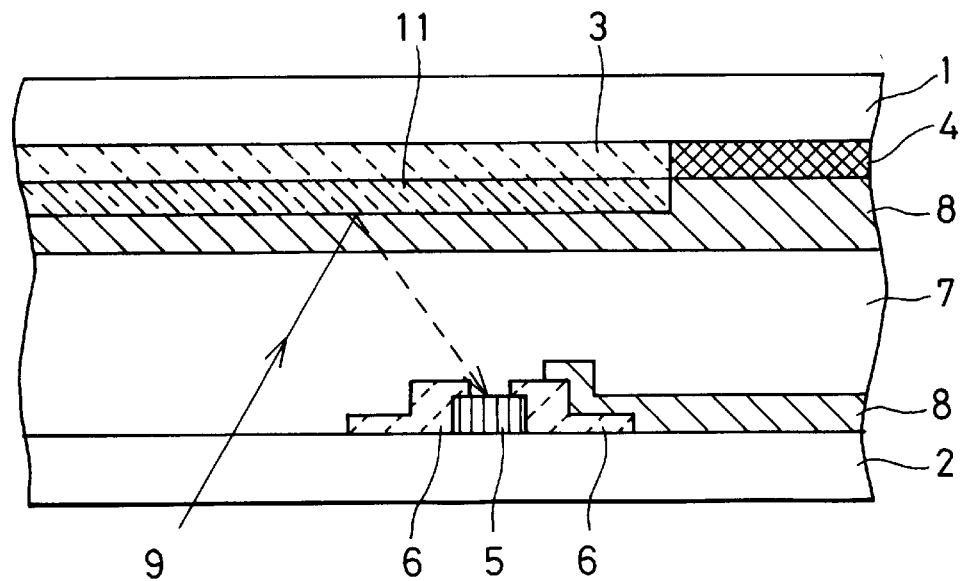
FIG. 2 is a cross-sectional view of another conventional color liquid crystal display.

In a conventional liquid crystal display as illustrated in FIG. 2 in which the light-absorbing film or the thin resin film 11 is formed on the light-impermeable layer 3, it is necessary to newly add fabrication steps for forming the film 11. On the other hand, the invention merely extends the colored layer 4 to form the extensions 10a to 10d, and hence does not need to newly add fabrication steps. Provided that photo resist is used for forming each of the colored regions R, G and B in the formation of the colored layer 4, the arrangement of the colored layer 4 as illustrated in FIG. 4 can be obtained only by enlarging a photo resist pattern above and below the display area S by a length of one picture element and to the left and right of the display area S by a length of three picture elements. Herein, the three picture elements to be included in each of the extensions 10a and 10b are red-colored, green-colored and blue-colored picture elements.

Figure 1:
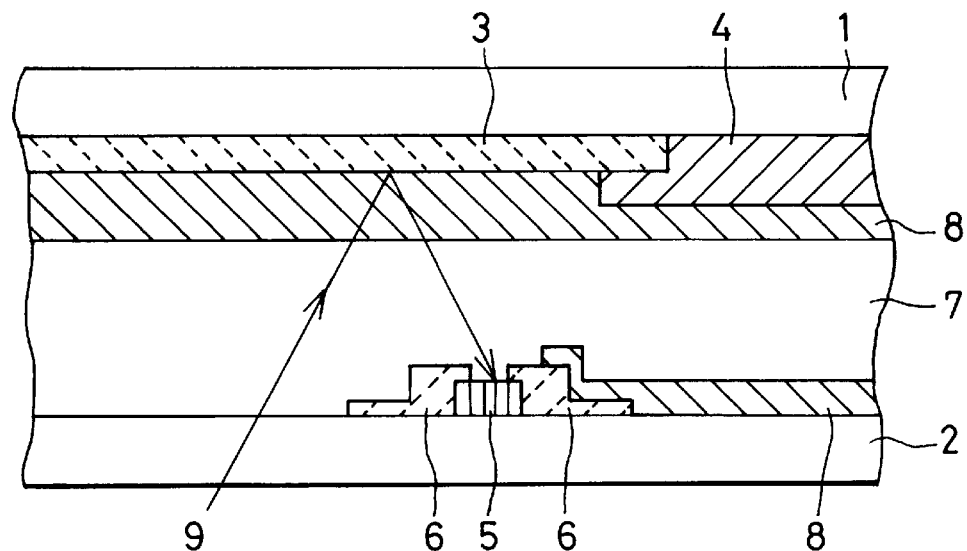
FIG. 1 is a cross-sectional view of a conventional color liquid crystal display.

In addition, since it is no longer necessary to use an outermost colored region, on which a step has been formed, as the display area S, nonuniformity of display can be prevented. In about 95% of the conventional color liquid crystal displays illustrated in FIG. 1, an outermost row in the display area S was whitened when the black level was displayed. The invention can reduce the whitened rows of a picture element in the display area S down to zero %.

The conventional color liquid display shows the nonuniformity of display to be caused by a step formed on the colored layer, by about 7%. The invention can reduce the display nonuniformity down to 1% or less.

Figure 5:
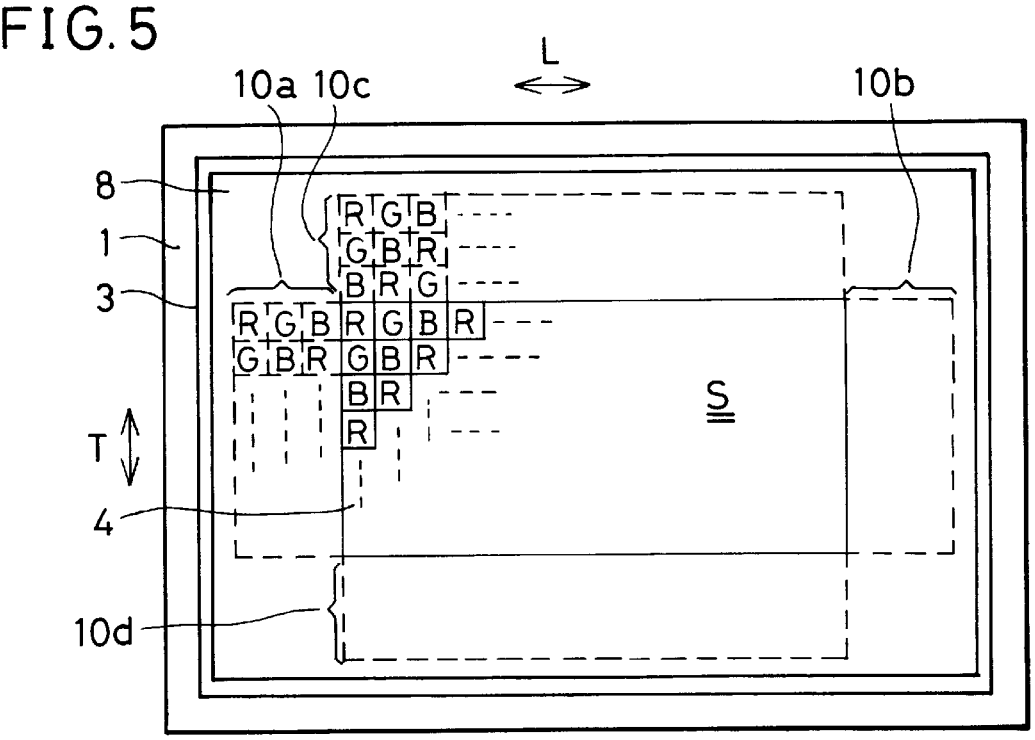
FIG. 5 is a plan view of one of substrates of the color liquid crystal display in accordance with the second embodiment of the present invention.

FIG. 5 shows an arrangement of picture elements in the colored layer 4 of the color liquid crystal display in accordance with the second embodiment of the present invention. The arrangement of picture elements illustrated in FIG. 5 is generally called mosaic type. The colored layer 4 comprises red-colored picture elements R, green-colored picture elements G and blue-colored picture elements B successively arranged in a lattice configuration. Namely, the picture elements R, G and B are disposed adjacent to each other in longitudinal and transverse directions of the display area S. In addition, the picture elements are disposed so that one of the picture elements is surrounded by the other two picture elements. For instance, the red-colored picture element R is surrounded only by the green-colored and blue-colored picture elements G and B, and never surrounded by the red-colored picture element R.

Similarly to the first embodiment, the colored layer 4 has extensions 10a, 10b, 10c and 10d extending over the display area S in both the longitudinal and transverse directions L and T of the display area S. Specifically, each of the longitudinal extensions 10a and 10b has a length of three picture elements, and each of the transverse extensions 10c and 10d also has a length of three picture elements.

The color liquid crystal display in accordance with the second embodiment has the same cross-section as that of the first embodiment illustrated in FIG. 3. Thus, a light to be radiated to the switching element 5 disposed on the substrate 2 can be reduced, and hence the whitening of the black level at the outermost region of the display area S can be prevented.

The difference of the second embodiment from the first embodiment is that a picture element having one of the three colors is surrounded by picture elements having the other two colors. Thus, in order not to use the outermost picture elements on which a step has been formed, it is necessary to enlarge the display area S by at least 3 picture elements in both the longitudinal and transverse directions L and T. Similarly to the first embodiment, the extensions 10a to 10d may have a greater length. Namely, the longitudinal and transverse extensions 10a to 10d may have a length of four picture elements or greater.

The extensions 10a to 10d having a length of three picture elements can be formed without additional fabrication steps, similarly to the first embodiment. Namely, the extensions 10a to 10d can be formed only by changing a photo resist pattern.

Figure 6:
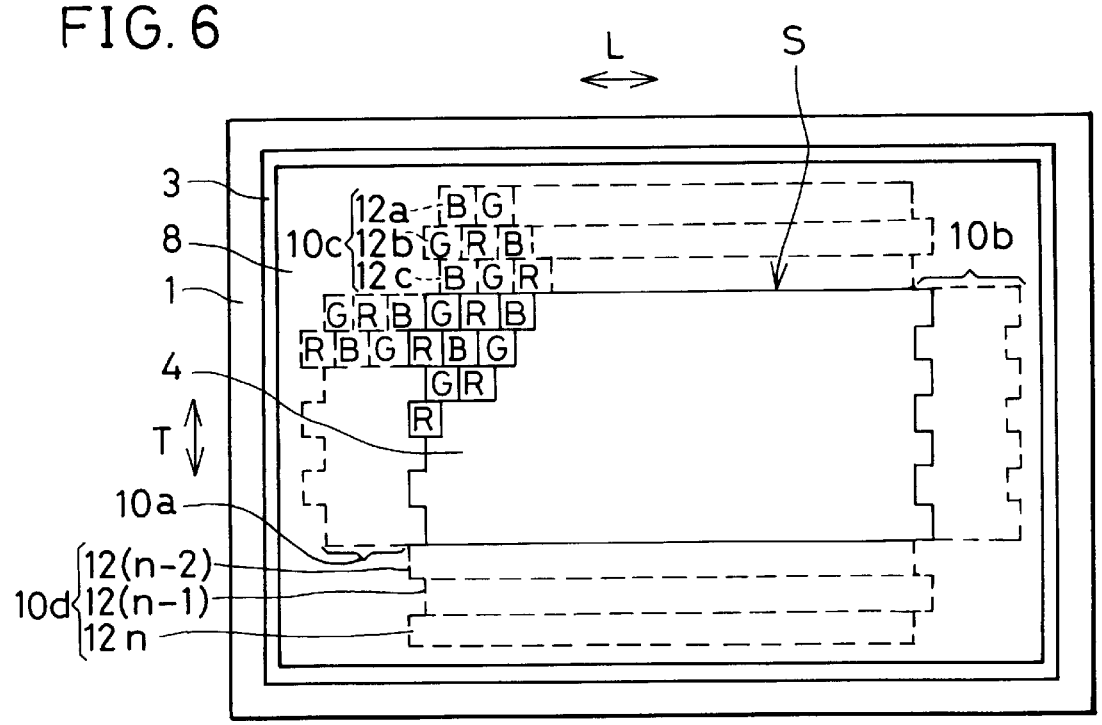
FIG. 6 is a plan view of one of substrates of the color liquid crystal display in accordance with the third embodiment of the present invention.

FIG. 6 shows an arrangement of picture elements in the colored layer 4 of the color liquid crystal display in accordance with the third embodiment of the present invention. The arrangement of picture elements illustrated in FIG. 6 is generally called triangular type. The colored layer 4 comprises a plurality of rows 12a to 12n. Each of the rows 12a to 12n comprises red-colored picture elements, green-colored picture elements and blue-colored picture elements successively arranged adjacent to each other in a longitudinal direction L of the color liquid crystal display. The picture element rows 12a to 12n are offset to each other by half of a length of one picture element so that one of the picture elements is surrounded by the other two picture elements. For instance, the red-colored picture element R is surrounded only by the green-colored and blue-colored picture elements G and B, and never surrounded by the red-colored picture element R.

Similarly to the first and second embodiments, the colored layer 4 has extensions 10a, 10b, 10c and 10d extending over the display area S in both the longitudinal and transverse directions of the display area S. Each of the longitudinal extensions 10a and 10b has a length of three picture elements, and each of the transverse extensions 10c and 10d has a length of three picture elements. Namely, the transverse extension 10c comprises the rows 12a to 12c, while the transverse extension 10d comprises the rows 12(n–2) to 12n. The color liquid crystal display in accordance with the third embodiment has the same structure as that of the first and second embodiments except the above mentioned arrangement of the picture elements R, G and B, and hence has the same operation and function as those of the first and second embodiments.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A color liquid crystal display comprising:
   two transparent substrates A and B disposed in facing relation;
   a plurality of switching elements disposed on a surface of said substrate A, said surface facing said substrate B, said switching elements defining an area;

a light-impermeable layer disposed on a surface of said substrate B, said surface facing said substrate A; and a colored layer overlying said light-impermeable layer and defining a display area corresponding to said area defined by said switching elements, said colored layer having an extension extending over said display area in longitudinal and transverse directions of said display area, said extension having a length of at least one picture element.

2. The color liquid crystal display as recited in claim 1, wherein said extension has a length of at least one picture element.

3. The color liquid crystal display as recited in claim 1, wherein said extension is made of the same material as that of said display area.

4. The color liquid crystal display as recited in claim 1, wherein said colored layer is made of light-permeable resin containing pigment therein.

5. A color liquid crystal display comprising:

two transparent substrates A and B disposed in facing relation;

a plurality of switching elements disposed on a surface of said substrate A, said surface facing said substrate B, said switching elements defining an area;

a light-impermeable layer disposed on a surface of said substrate B, said surface facing said substrate A; and a colored layer overlying said light-impermeable layer and defining a display area corresponding to said area defined by said switching elements, said colored layer comprising a red-colored stripe-shaped region, a green-colored stripe-shaped region and a blue-colored stripe-shaped region successively arranged adjacent to each other in a longitudinal direction of said display area, each of said regions comprising a plurality of picture elements successively arranged adjacent to each other in a transverse direction of said display area, said colored layer having extensions extending over said display area in said longitudinal and transverse directions of said display area, said longitudinal extension having a length of at least three picture elements and said transverse extension having a length of at least one picture element.

6. The color liquid crystal display as recited in claim 5, wherein said extensions are made of the same material as that of said display area.

7. The color liquid crystal display as recited in claim 5, wherein said colored layer is made of light-permeable resin containing pigment therein.

8. A color liquid crystal display comprising:

two transparent substrates A and B disposed in facing relation;

a plurality of switching elements disposed on a surface of said substrate A, said surface facing said substrate B, said switching elements defining an area;

a light-impermeable layer disposed on a surface of said substrate B, said surface facing said substrate A; and a colored layer overlying said light-impermeable layer and defining a display area corresponding to said area defined by said switching elements, said colored layer comprising red-colored picture elements, green-colored picture elements and blue-colored picture elements successively arranged adjacent to each other in a lattice configuration in longitudinal and transverse directions of said display area so that one of said picture elements is surrounded by the other two picture elements, said colored layer having extensions extending over said display area in said longitudinal and transverse directions of said display area, said longitudinal extension having a length of at least three picture elements and said transverse extension having a length of at least three picture elements.

9. The color liquid crystal display as recited in claim 8, wherein said extensions are made of the same material as that of said display area.

10. The color liquid crystal display as recited in claim 8, wherein said colored layer is made of light-permeable resin containing pigment therein.

11. A color liquid crystal display comprising:

two transparent substrates A and B disposed in facing relation;

a plurality of switching elements disposed on a surface of said substrate A, said surface facing said substrate B, said switching elements defining an area;

a light-impermeable layer disposed on a surface of said substrate B, said surface facing said substrate A; and a colored layer overlying said light-impermeable layer and defining a display area corresponding to said area defined by said switching elements, said colored layer comprising a plurality of rows each comprising red-colored picture elements, green-colored picture elements and blue-colored picture elements successively arranged adjacent to each other in a longitudinal direction in said display area, said rows being offset to each other by half of a length of one picture element so that one of said picture elements is surrounded by the other two picture elements, said colored layer having extensions extending over said display area in said longitudinal and transverse directions of said display area, said longitudinal extension having a length of at least three picture elements and said transverse extension having a length of at least three picture elements.

12. The color liquid crystal display as recited in claim 11, wherein said extensions are made of the same material as that of said display area.

13. The color liquid crystal display as recited in claim 11, wherein said colored layer is made of light-permeable resin containing pigment therein.

14. A color liquid crystal display comprising:

two transparent substrates A and B disposed in facing relation;

a plurality of switching elements disposed on a surface of said substrate A, said surface facing said substrate B, said switching elements defining an area;

a light-impermeable layer disposed on a surface of said substrate B, said surface facing said substrate A; and a colored layer overlying said light-impermeable layer and defining a display area corresponding to said area defined by said switching elements, said colored layer having an extension extending over said display area in longitudinal and transverse directions of said display area, wherein said extension extends over said light-impermeable layer to such a length that light impinging at any place on said light-impermeable layer, where said light can then reflect from said light-impermeable layer and radiate onto one of said switching elements, is at least partially absorbed by said colored layer.

15. The color liquid crystal display as recited in claim 14, wherein said colored layer is sufficiently light absorbing so that said light impinging on and then reflecting from said light-impermeable layer and radiating onto said one of said switching elements will not cause a black level at a boundary of said display area from being whitened.

* * * * *

(12) REEXAMINATION CERTIFICATE (4835th)
United States Patent
Miura et al.

(10) Number: US 5,812,228 C1
(45) Certificate Issued: Aug. 19, 2003

(54) COLOR LIQUID CRYSTAL DISPLAY WITH EXTENSIONS OF THE COLORED LAYER COVER THE LIGHT-IMPERMEABLE LAYER

(75) Inventors: Junichirou Miura, Kagoshima (JP); Toshiaki Ishiyama, Tokyo (JP)

(73) Assignee: NEC Corporation, Tokyo (JP)

Reexamination Request:
No. 90/005,555, Nov. 9, 1999

Reexamination Certificate for:
Patent No.: 5,812,228
Issued: Sep. 22, 1998
Appl. No.: 08/538,211
Filed: Oct. 3, 1995

(30) Foreign Application Priority Data

Oct. 28, 1994 (JP) .............................................. 6-265572

(51) Int. Cl.⁷ ...................... G02F 1/1335; G02F 1/1333
(52) U.S. Cl. ...................... 349/106; 349/108; 349/109; 349/110
(58) Field of Search ................................. 349/106, 108, 349/109, 110

(56) References Cited

U.S. PATENT DOCUMENTS

| 5,365,357 A | 11/1994 | Ohgawara |
| 5,617,230 A | 4/1997 | Ohgawara |

FOREIGN PATENT DOCUMENTS

| EP | 0 338 412 B1 | 10/1989 |
| EP | 0338412 B1 | 3/1995 |
| JP | 60-243638 | 12/1985 |
| JP | 61-272720 | 12/1986 |
| JP | 61-292616 | 12/1986 |
| JP | 62-58219 | 3/1987 |
| JP | 62-94826 | 5/1987 |
| JP | 62-210425 | 6/1987 |
| JP | 63-33730 | 2/1988 |
| JP | 63-92920 | 4/1988 |
| JP | 63-274462 | 11/1988 |
| JP | 64-9420 | 1/1989 |
| JP | 1-105219 | 4/1989 |
| JP | 1-243020 | 9/1989 |
| JP | 1-257823 | 10/1989 |
| JP | 1-269917 | 10/1989 |
| JP | 1-293317 | 11/1989 |
| JP | 1-171424 | 12/1989 |
| JP | 2-37326 | 2/1990 |
| JP | 2-37327 | 2/1990 |
| JP | 2-40618 | 2/1990 |
| JP | 2-87115 | 3/1990 |
| JP | 2-123325 | 5/1990 |
| JP | 2-234122 | 9/1990 |
| JP | 2-238643 | 9/1990 |
| JP | 2-239231 | 9/1990 |
| JP | 2-240632 | 9/1990 |
| JP | 2-251989 | 10/1990 |

(List continued on next page.)

OTHER PUBLICATIONS

Endo et al, "Advanced Color–Filter Substrate Technologies for High–Quality TFT–LCDs"; Proceedings of the SID vol. 31/2, 1990, p. 107–112, May 1990.*
Bahadur, "Liquid Crystals: Applications and Uses", World Scientific Publishing, pp. 171–188, 1990.*

(List continued on next page.)

*Primary Examiner*—Kenneth Parker

(57) ABSTRACT

The invention provides a color liquid crystal display including (a) two transparent substrates A and B disposed in facing relation, (b) a plurality of switching elements disposed on a surface of the substrate A, the surface facing the substrate B, said switching elements defining an area, (c) a light-impermeable layer disposed on a surface of the substrate B, the surface facing the substrate A, and (d) a colored layer overlying the light-impermeable layer and defining a display area corresponding to the area defined by the switching elements. The colored layer has an extension extending [over] *outside* the display area in longitudinal and transverse directions of the display area. The extensions of the colored layer cover the light-impermeable layer therewith to thereby prevent a light reflected from the light-impermeable layer from entering the switching element. Thus, it is possible to prevent the black level of the display area from being whitened.

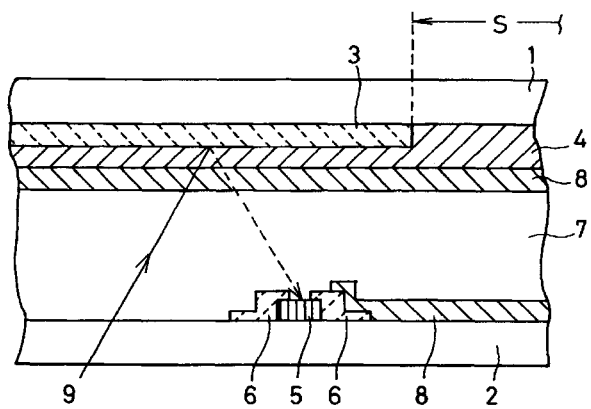

FOREIGN PATENT DOCUMENTS

| | | |
|---|---|---|
| JP | 2-287434 | 11/1990 |
| JP | 2-287435 | 11/1990 |
| JP | 2-293720 | 12/1990 |
| JP | 3-15822 | 1/1991 |
| JP | 3-94231 | 4/1991 |
| JP | 3-125120 | 5/1991 |
| JP | 4-1726 | 1/1992 |
| JP | 4-1728 | 1/1992 |
| JP | 4-20927 | 1/1992 |
| JP | 4-28622 | 3/1992 |
| JP | 4-184301 | 7/1992 |
| JP | 4-345132 | 12/1992 |
| JP | 5-5876 | 1/1993 |
| JP | 5-27229 | 2/1993 |
| JP | 5-47925 | 2/1993 |
| JP | 5-119309 | 5/1993 |
| JP | 5-134106 | 5/1993 |
| JP | 5-143026 | 6/1993 |
| JP | 5-158067 | 6/1993 |
| JP | 5-216005 | 8/1993 |
| JP | 5-323308 | 12/1993 |
| JP | 6-3518 | 1/1994 |
| JP | 60-031518 | 1/1994 |
| JP | 6-27480 | 2/1994 |
| JP | 6-34999 | 2/1994 |
| JP | 6-43455 | 2/1994 |
| JP | 60-27480 | 2/1994 |
| JP | 6-59116 | 3/1994 |
| JP | 6-82762 | 3/1994 |
| JP | 6-33133 | 4/1994 |
| JP | 6-123882 | 5/1994 |
| JP | 6-138456 | 5/1994 |
| JP | 06175121 A | 6/1994 |
| JP | 6-214110 | 8/1994 |
| JP | 6-230349 | 8/1994 |
| JP | 6-258647 | 9/1994 |
| JP | 07128515 A | 5/1995 |
| JP | 7-152022 | 6/1995 |

OTHER PUBLICATIONS

Toshiaki Takamatsu, Shinichi Ogawa, and Mitsuo Ishii, "Color Filter Fabrication Technology for LCDs," pp. 69–71.

Schematics of NEC LCD modules designated Type I and Type II.

Patent Abstracts of Japan, Japanese Application No. 61–52513, application published Sep. 16, 1987.

Patent Abstracts of Japan, Japanese Application No. 63–84137, application published Oct. 13, 1989.

Abstract, Japanese Laid Open Publication. 63–92920, Apr. 23, 1988.

Abstract, Japanese Laid Open Publication. 4–184301, Jul. 1, 1992.

Abstract, Japanese Laid Open Publication. 5–158067, Jun. 25, 1993.

Abstract, Japanese Laid Open Publication 4–28622, Mar. 6, 1992.

Abstract, Japanese Laid Open Publication. 4–345132, Dec. 1, 1992.

Abstract, Japanese Publication No. 06175121–A, Jun. 24, 1994.

Abstract, Japanese Publication No. 07128515–A, May 19, 1995.

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 13–25:

The invention provides a color liquid crystal display including (a) two transparent substrates A and B disposed in facing relation, (b) a plurality of switching elements disposed on a surface of the substrate A, the surface facing the substrate B, the switching elements defining an area, (c) a light-impermeable layer disposed on a surface of the substrate B, the surface facing the substrate A, and (d) a colored layer overlying the light-impermeable layer and defining a display area corresponding to the area defined by the switching elements, the colored layer having extensions extending [over] *outside* the display area in longitudinal and transverse directions of the display area. The extension preferably has a length of at least one picture element.

Column 2, lines 26–46:

The invention further provides a color liquid crystal display including (a) two transparent substrates A and B disposed in facing relation, (b) a plurality of switching elements disposed on a surface of the substrate A, the surface facing the substrate B, the switching elements defining an area, (c) a light-impermeable layer disposed on a surface of the substrate B, the surface facing the substrate A, and (d) a colored layer overlying the light-impermeable layer and defining a display area corresponding to the area defined by the switching elements, the colored layer including a red-colored stripe-shaped region, a green-colored stripe-shaped region and a blue-colored stripe-shaped region successively arranged adjacent to each other in a longitudinal direction of the display area, each of the regions including a plurality of picture elements successively arranged adjacent to each other in a transverse direction of the display area, the colored layer having extensions extending [over] *outside* the display area in the longitudinal and transverse directions of the display area, the longitudinal extension having a length of at least three picture elements and the transverse extension having a length of at least one picture elements.

Column 2, lines 47–65:

The invention still further provides a color liquid crystal display including (a) two transparent substrates A and B disposed in facing relation, (b) a plurality of switching elements disposed on a surface of the substrate A, the surface facing the substrate B, the switching elements defining an area, (c) a light-impermeable layer disposed on a surface of the substrate B, the surface facing the substrate A, and (d) a colored layer overlying the light-impermeable layer and defining a display area corresponding to the area defined by the switching elements, the colored layer including red-colored picture elements, green-colored picture elements and blue-colored picture elements successively arranged adjacent to each other in a lattice configuration in longitudinal and transverse directions of the display area so that one of the picture elements is surrounded by the other two picture elements, the colored layer having extensions extending [over] *outside* the display area in the longitudinal and transverse directions of the display area, the longitudinal extension having a length of at least three picture elements and the transverse extension having a length of at least three picture elements.

Column 3, lines 3–24:

The invention yet further provides a color liquid crystal display including (a) two transparent substrates A and B disposed in facing relation, (b) a plurality of switching elements disposed on a surface of the substrate A, the surface facing the substrate B, the switching elements defining an area, (c) a light-impermeable layer disposed on a surface of the substrate B, the surface facing the substrate A, and (d) a colored layer overlying the light-impermeable layer and defining a display area corresponding to the area defined by the switching elements, the colored layer including a plurality of rows each having red-colored picture elements, green-colored picture elements and blue-colored picture elements successively arranged adjacent to each other in a longitudinal and direction of the display area, the rows being offset to each other by half of a length of one picture element so that one of the picture elements is surrounded by the other two picture elements, the colored layer having extensions extending [over] *outside* the display area in the longitudinal and transverse directions of the display area, the longitudinal extension having a length of at least three picture elements and the transverse extension having a length of at least three picture elements.

Column 4, line 63–column 5, line 7:

As earlier mentioned, the colored layer 4 is formed with the extensions 10a, 10b, 10c and 10d extending [over] *outside* the display area S. As illustrated in FIG. 4, the extensions 10a and 10b extend [over] *outside* the display S in the longitudinal direction L of the display area S, while the extensions 10c and 10d extend in the transverse direction T of the display area S. Each of the longitudinal extensions 10a and 10b has a length of three picture elements, while each of the transverse extensions 10c and 10d has a length of one picture element.

Column 5, lines 58–64:

Similarly to the first embodiment, the colored layer 4 has extensions 10a, 10b, 10c and 10d extending [over] *outside* the display area S in both the longitudinal and transverse directions L and T of the display area S. Specifically, each of the longitudinal extensions 10a and 10b has a length of three picture elements, and each of the transverse extensions 10c and 10d also has a length of three picture elements.

Column 6, lines 39–53:

Similarly to the first and second embodiments, the colored layer 4 has extensions 10a, 10b, 10c and 10d extending [over] *outside* the display area S in both the longitudinal and transverse directions of the display area S. Each of the longitudinal extensions 10a and 10b has a length of three picture elements, and each of the transverse extensions 10c and 10d has a length of three picture elements. Namely, the transverse extension 10c comprises the rows 12a to 12c, while the transverse extension 10d comprises the rows 12(n–2) to 12n. The color liquid crystal display in accordance with the third embodiment has the same structure as that of the first and second embodiments except the above mentioned arrangement of the picture elements R, G and B, and hence has the same operation and function as those of the first and second embodiments.

AS A RESULT OF REEXAMINATION, IT HAS BEEN DETERMINED THAT:

Claims 1–15 are cancelled.

\* \* \* \* \*